US012591648B2

(12) United States Patent (10) Patent No.: US 12,591,648 B2
Nara et al. (45) Date of Patent: Mar. 31, 2026

(54) BIOMETRIC AUTHENTICATION SYSTEM, TEMPLATE UPDATING METHOD THEREFOR, STORAGE MEDIUM, BIOMETRIC AUTHENTICATION CLIENT DEVICE, AND BIOMETRIC AUTHENTICATION SERVER DEVICE

(71) Applicant: NEC Corporation, Tokyo (JP)

(72) Inventors: Masahiro Nara, Tokyo (JP); Toshihiko Okamura, Tokyo (JP); Toshiyuki Isshiki, Tokyo (JP); Kengo Mori, Tokyo (JP); Hiroto Tamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 18/274,667

(22) PCT Filed: Jan. 29, 2021

(86) PCT No.: PCT/JP2021/003294
§ 371 (c)(1),
(2) Date: Jul. 27, 2023

(87) PCT Pub. No.: WO2022/162884
PCT Pub. Date: Aug. 4, 2022

(65) Prior Publication Data
US 2024/0104182 A1 Mar. 28, 2024

(51) Int. Cl.
*G06F 21/32* (2013.01)

(52) U.S. Cl.
CPC .................................... *G06F 21/32* (2013.01)

(58) Field of Classification Search
CPC .................................... G06F 21/32; H04L 9/32
See application file for complete search history.

(56) References Cited

U.S. PATENT DOCUMENTS

| | | | | |
|---|---|---|---|---|
| 10,205,723 B2 * | 2/2019 | Farrell | ................ | H04L 63/0428 |
| 10,515,204 B2 * | 12/2019 | Beatson | .................. | G06F 21/45 |
| 11,139,964 B1 * | 10/2021 | Griffin | ...................... | H04L 9/50 |

(Continued)

FOREIGN PATENT DOCUMENTS

| | | |
|---|---|---|
| JP | 2005-293490 A | 10/2005 |
| JP | 2018-207433 A | 12/2018 |

(Continued)

OTHER PUBLICATIONS

International Search Report for PCT Application No. PCT/JP2021/003294, mailed on Apr. 27, 2021.

*Primary Examiner* — Mohamed A. Wasel

(74) *Attorney, Agent, or Firm* — Sughrue Mion, PLLC

(57) ABSTRACT

A conventional biometric authentication system has been time-consuming and labor-intensive for users since the users are requested to re-register their biometric information. According to an aspect of the present disclosure, a biometric authentication system includes an update value generation unit configured to generate an update value, a first update processing unit configured to update, using the update value, a template generated based on biometric information, and a second update processing unit configured to update, using the update value, a verification key generated along with the template based on the biometric information using the update value.

13 Claims, 6 Drawing Sheets

1

(56)  References Cited

U.S. PATENT DOCUMENTS

| | | | |
|---|---|---|---|
| 11,936,789 B1* | 3/2024 | Griffin | ............... G06F 21/32 |
| 2010/0191967 A1* | 7/2010 | Fujii | .............. H04L 63/0861 |
| | | | 713/169 |
| 2014/0247939 A1 | 9/2014 | Hattori et al. | |
| 2017/0161480 A1* | 6/2017 | Jo | ..................... G06V 40/53 |
| 2020/0019685 A1 | 1/2020 | Takahashi | |
| 2020/0127824 A1* | 4/2020 | Gehrmann | .......... H04L 9/3231 |
| 2020/0244451 A1* | 7/2020 | Herder, III | .......... H04L 9/0894 |
| 2021/0160081 A1* | 5/2021 | Haring | .............. H04L 9/14 |
| 2022/0321363 A1 | 10/2022 | Isshiki et al. | |

FOREIGN PATENT DOCUMENTS

| | | |
|---|---|---|
| JP | 2019-102979 A | 6/2019 |
| WO | 2013/080320 A1 | 6/2013 |
| WO | 2020/245939 A1 | 12/2020 |

* cited by examiner

1

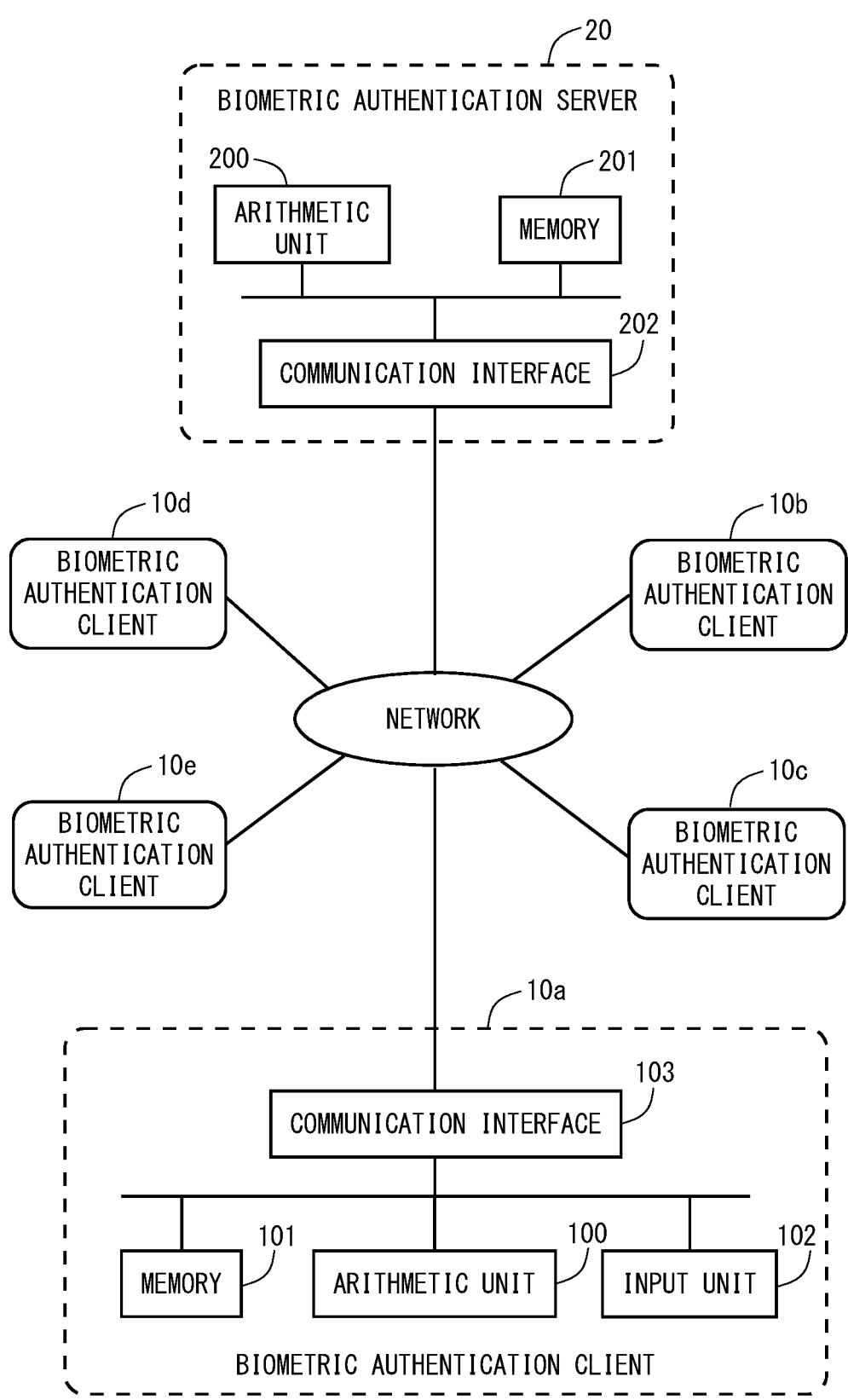
F i g. 6

BIOMETRIC AUTHENTICATION SYSTEM, TEMPLATE UPDATING METHOD THEREFOR, STORAGE MEDIUM, BIOMETRIC AUTHENTICATION CLIENT DEVICE, AND BIOMETRIC AUTHENTICATION SERVER DEVICE

This application is a National Stage Entry of PCT/JP2021/003294 filed on Jan. 29, 2021, the contents of all of which are incorporated herein by reference, in their entirety.

TECHNICAL FIELD

The present disclosure relates to a biometric authentication system, a template updating method therefor, a storage medium, a biometric authentication client device, and a biometric authentication server device, and in particular, to a biometric authentication system which uses a verification key to determine the validity of concealed authentication information in which biometric information entered using a template is concealed, a template updating method therefor, a storage medium, a biometric authentication client device, and a biometric authentication server device.

BACKGROUND ART

One method of authentication of an individual is biometric authentication in which individual's biometric information is used. In such biometric authentication, biometric information used for authentication is registered in advance. In this case, the biometric information poses a security risk if the biometric information is stored as is. Therefore, the biometric information to be used is stored as a template that is concealed at the time of registration using a concealment key. The technique of performing biometric authentication while keeping the biometric information (template) registered in advance concealed is referred to as concealed biometric authentication. In such concealed biometric authentication, a verification key is used to determine the validity of the entered biometric information at the time of authentication. An example of a technique of performing such concealed biometric authentication is disclosed in Patent Literature 1.

The biometric authentication system described in Patent Literature 1 includes a registered authentication server configured to compare a template generated based on the biometric information entered by a user with a template generated by decrypting an encrypted template representing the biometric information of the user stored in a storage medium and perform authentication of the user based on the comparison result, and when the authentication of a user performed by the registered authentication has been successful, the system replaces the encrypted template stored in the storage medium with a template encrypted using a different encryption key and stores the replaced template.

CITATION LIST

Patent Literature

Patent Literature 1: Japanese Unexamined Patent Application Publication No. 2005-293490

SUMMARY OF INVENTION

Technical Problem

In the event of leakage of a template in a biometric authentication system, the security risks are not eliminated unless the template is updated. One way to update the template is to re-enter the biometric information and create a new template. However, in order to create a new template, it is necessary to request the user to re-register his/her biometric information, which is time-consuming and labor-intensive for the user.

Solution to Problem

According to an aspect of the present disclosure, a biometric authentication system includes: an update value generation unit configured to generate an update value; a first update processing unit configured to update, using the update value, a template generated based on biometric information, and a second update processing unit configured to update, using the update value, a verification key generated along with the template based on the biometric information.

According to an aspect of the present disclosure, a template updating method is for a biometric authentication system that includes a template storage unit configured to store a template used for concealing biometric information and a verification key storage unit configured to store a verification key used for verification of the concealed biometric information, the method including: generating an update value in the biometric authentication system; updating the template using the update value; and updating the verification key using the update value.

According to an aspect of the present disclosure, a template update program is stored in a computer-readable storage medium storing a program to be executed in a biometric authentication system including a template storage unit configured to store a template used for concealing biometric information, a verification key storage unit configured to store a verification key used for verifying the concealed biometric information, and an arithmetic unit configured to execute a program, in which the template update program is for performing: an update value generation process for generating an update value in the biometric authentication system, and a template update process for updating the template using the update value, and a verification key update process for updating the verification key using the update value.

According to an aspect of the present disclosure, a biometric authentication client device includes: an update value generation unit configured to generate an update value; and a template update processing unit configured to update, using the update value, a template generated based on biometric information, the update value generation unit being configured to transmit the update value to a biometric authentication server device having a verification key generated along with the template based on the biometric information.

According to an aspect of the present disclosure, a biometric authentication server device includes: an update value generation unit configured to update an update value; and a verification key update processing unit configured to update a verification key using the update value, the verification key being used for verifying the validity of concealed authentication information that is concealed using a template generated based on biometric information, the update value generation unit being configured to transmit the update value to the biometric authentication client device that includes the template.

Advantageous Effects of Invention

According to the present disclosure, a biometric authentication system, a template updating method therefor, a template updating program, a biometric authentication client device, and a biometric authentication server device are each adapted to facilitate updating of a template in the biometric authentication system.

BRIEF DESCRIPTION OF DRAWINGS

FIG. 6 is a block diagram illustrating an example of a biometric authentication system hardware configuration according to an example embodiment.

EXAMPLE EMBODIMENT

Figure 1:
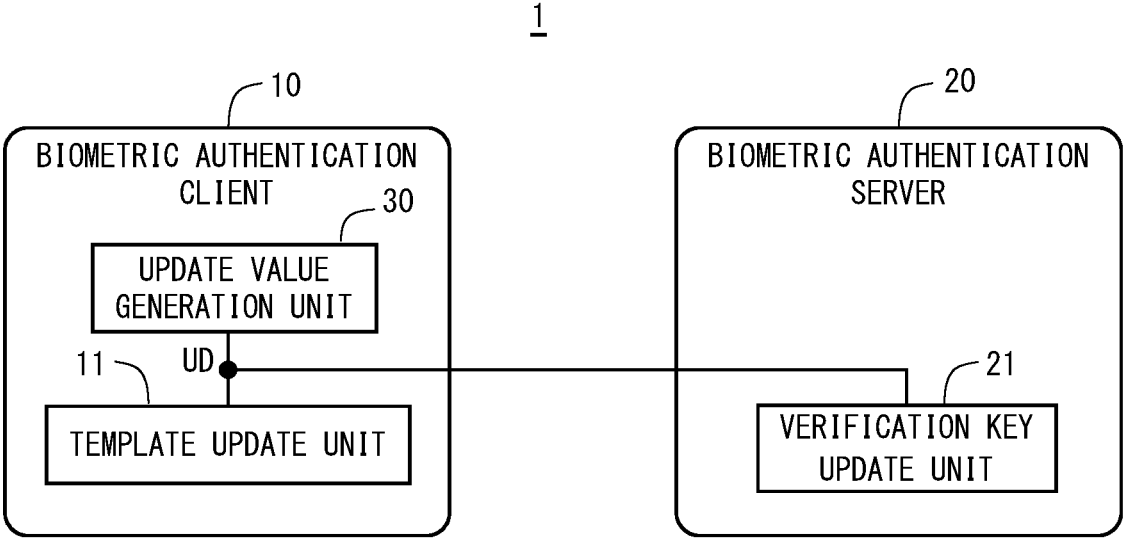
FIG. 1 is a block diagram of a biometric authentication system according to a first example embodiment.

For clarity of explanation, the following descriptions and drawings have been omitted and simplified as appropriate. In addition, each element described in the drawings as a functional block that performs various processing can be composed of a CPU (Central Processing Unit), a memory, and other circuits in terms of hardware, and can be realized by a program loaded in the memory, or the like in terms of software. Therefore, it is understood by those skilled in the art that these functional blocks can be realized in various forms of hardware alone, software alone, or a combination thereof, and it is not to be limited to any one of them. In each figure, the same elements are denoted by the same reference symbols and redundant explanations thereof are omitted where appropriate.

Further, the programs mentioned above can be stored and provided to a computer using any type of non-transitory computer readable media. Non-transitory computer readable media include any type of tangible storage media. Examples of non-transitory computer readable media include magnetic storage media (e.g. floppy disks, magnetic tapes, hard disk drives), optical magnetic storage media (e.g. magneto-optical disks), CD-ROM (Read Only Memory), CD-R, CD-R/W, semiconductor memories (e.g. mask ROM, PROM (Programmable ROM), EPROM (Erasable PROM), flash ROM, and RAM (Random Access Memory), etc.). The programs may be provided to a computer using any type of transitory computer readable media. Examples of transitory computer readable media include electric signals, optical signals, and electromagnetic waves. Transitory computer readable media can provide the programs to a computer via a wired communication line such as electric wires and optical fibers or a wireless communication line.

An example in which two devices, a biometric authentication server and a biometric authentication client which the user interacts with, are provided separately will be described with reference to a biometric authentication system according to an example embodiment. However, a biometric authentication system may implement the functions of biometric authentication server and the biometric authentication client as one device.

First Example Embodiment

FIG. 1 shows a block diagram of a biometric authentication system 1 according to a first example embodiment. As shown in FIG. 1, the biometric authentication system 1 according to the first example embodiment includes a biometric authentication client 10 and a biometric authentication server 20. The biometric authentication client 10 and the biometric authentication server 20 are connected via a network so that data can be sent and received to and from each other.

The biometric authentication system 1 according to the first example embodiment performs, as its basic function, biometric authentication processing of determining whether or not the user is a registered user by performing biometric authentication using biometric information such as the user's fingerprints, vein, and iris. In addition, the biometric authentication system 1 according to the first example embodiment has a function to update the template used for biometric authentication processing. In FIG. 1, as regards the biometric authentication client 10 and the biometric authentication server 20, only the main blocks related to updating of a template and a verification key, which are one of the features, are shown. That is, the biometric authentication client 10 and the biometric authentication server 20 each include other unillustrated blocks.

In FIG. 1, the biometric authentication client 10 includes a first update processing unit (e.g., a template update unit 11) and an update value generation unit 30. The biometric authentication server 20 includes a second update processing unit (e.g., a verification key update unit 21). The update value generation unit 30 generates an update value UD. The template update unit 11 updates, using the update value UD, a template generated based on the biometric information. Note that the template refers to information that is subjected to concealment processing within the biometric authentication client 10 by applying prescribed rules to the biometric information. The template is held in an unillustrated template storage unit, and the template update unit 11 updates and overwrites the template stored in the template storage unit.

The verification key update unit 21 updates, using the update value UD, the verification key generated along with the template based on the biometric information. The update key is, for example, obtained by performing concealment processing to a template by applying a random number to the template. The verification key is held in an unillustrated verification key storage unit, and the verification key update unit 21 updates and overwrites the verification key stored in the verification key storage unit.

Figure 2:
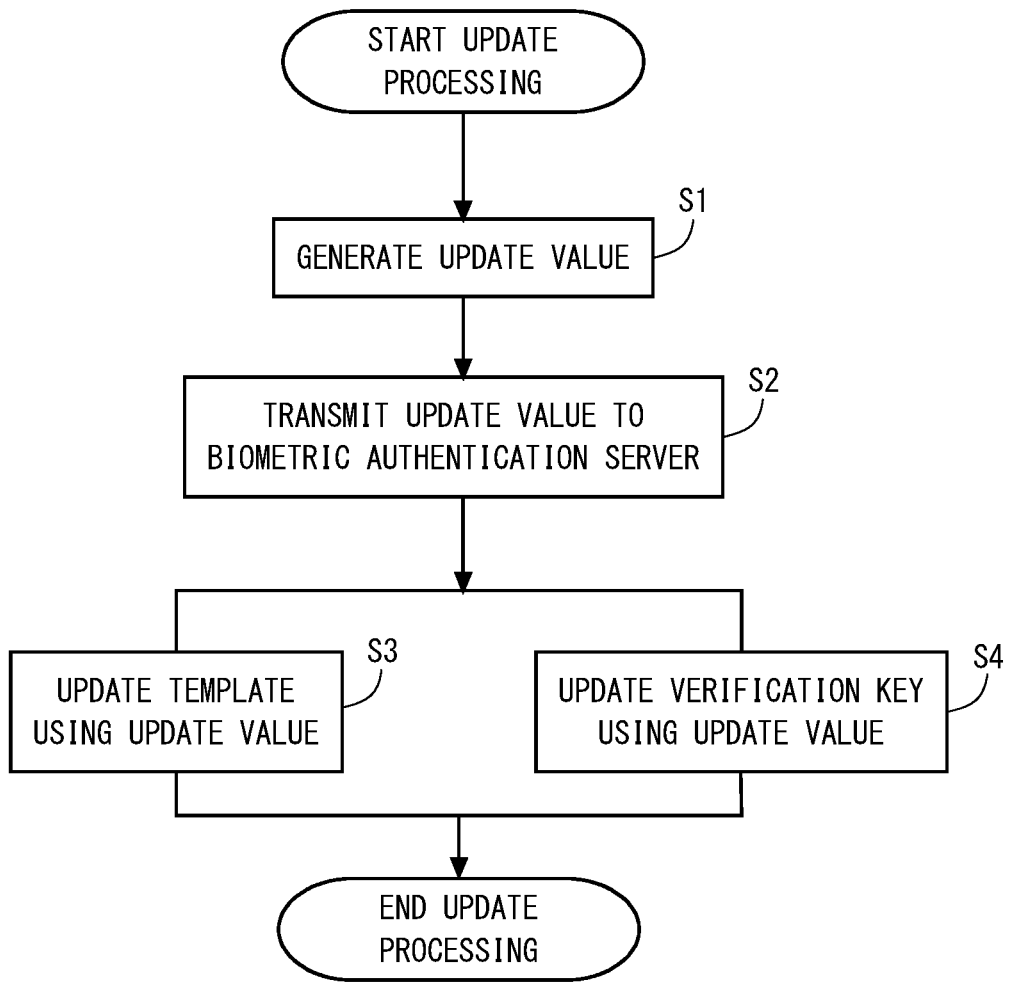
FIG. 2 is a flowchart illustrating a flow of template update processing in the biometric authentication system according to the first example embodiment.

Next, template update processing in the biometric authentication system 1 according to the first example embodiment will be described. FIG. 2 shows a flowchart describing the flow of template update processing performed in the biometric authentication system according to the first example embodiment. Note that in the biometric authentication system 1 according to the first example embodiment, the verification key is also updated in accordance with updating of the template. Thus, in the biometric authentication system 1 according to the first example embodiment, the consistency between the template and the verification key is maintained. Considering the above, an example of updating the template and the verification key based on the update value UD is shown in FIG. 2.

As shown in FIG. 2, in the biometric authentication system 1 according to the first example embodiment, the update value generation unit 30 first updates an update value UD (Step S1). Subsequently, the update value generation unit 30 transmits the update value UD to the biometric authentication server 20 (Step S2). Then, using the update value UD, the template update unit 11 updates the template (Step S3). Moreover, using the update value UD, the verification key update unit 21 updates the verification key (Step S4).

Here, one of the specific examples of the update processing of the template and the verification key performed using the update value UD will be described. Here, description will be given of an example in which the update processing is performed, using a random number Ra″ as the update value UD, in the biometric authentication system 1 that includes the biometric information, the template, and the verification key that are described below.

First, it is assumed that the biological information is a bio-feature vector expressed by Expression (1), the template is expressed by Expression (2), and the verification key is expressed by Expression (3). In the following description, n denotes the number of vector elements of the biological information, i denotes an integer indicating the number of vector elements greater than 0 and smaller than n, t denotes a preset coefficient, and R denotes a random number. Also, g denotes a generator of the group G whose order is a sufficiently large prime number q.

[Expression 1]

$$\{x1, x2, \ldots, xn\} \tag{1}$$

[Expression 2]

$$\{temp1[i], temp2[i]\} \tag{2}$$

[Expression 3]

$$\{Ra, Rb, g^{Rc}\} \tag{3}$$

Note that temp1 [i] and temp2 [i] within the template are expressed by Expressions (4) and (5).

[Expression 4]

$$temp1[i] = R\alpha \cdot xi + Rb \cdot ti + Rc \tag{4}$$

[Expression 5]

$$temp2[i] = g^{\tau i} \tag{5}$$

And in the biometric authentication system 1 according to the first example embodiment, a random number Ra″ is generated as a correction value UD in the update value generation unit 30. Then, the template update unit 11 applies the update value UD to the template to perform calculation according to Expression (6) and Expression (7), to thereby calculate the updated template expressed by Expression (8). Then, the template update unit 11 overwrites the template stored in the template storage unit with the updated template expressed by Expression (8).

[Expression 6]

$$temp1'[i] = temp1[i] \cdot Ra'' = Ra'' \cdot Ra \cdot xi + Ra'' \cdot Rb \cdot ti + Ra''Rc \tag{6}$$

$$= Ra' \cdot xi + Rb' \cdot ti + Rc'$$

[Expression 7]

$$temp2'[i] = temp2[i] \tag{7}$$

[Expression 8]

$$\{temp1'[i], temp2'[i]\} \tag{8}$$

Also, in the biometric authentication system 1 according to the first example embodiment, the random number Ra″ is received as the update value UD, and the verification key update unit 21 calculates the updated verification key expressed by Expressions (12) using Expressions (9) to (11).

[Expression 9]

$$Ra' = Ra'' \cdot Ra \tag{9}$$

[Expression 10]

$$Rb' = Ra'' \cdot Rb \tag{10}$$

[Expression 11]

$$g^{Rc'} = g^{Ra'' \cdot Rc} \tag{11}$$

[Expression 12]

$$\{Ra', Rb', g^{Rc'}\} \tag{12}$$

From the above description, in the biometric authentication system 1 according to the first example embodiment, a new template can be generated without using the biometric information by updating the template and the verification key using the correction value UD generated by the update value generation unit 30. In addition, in the biometric authentication system 1 according to the first example embodiment, the verification key is updated simultaneously with the template using the correction value UD. Thus, in the biometric authentication system 1 according to the first example embodiment, the consistency between the template and the verification key can be easily maintained.

In addition, in the biometric authentication system 1 according to the first example embodiment, since the update value UD is generated by the update value generation unit 30 in the system, the risk of leakage of information used for the update processing to outside parties is low. Also, the update value UD being a random number makes it difficult to generate the same update value, enabling the biometric authentication system 1 to maintain high security.

Second Example Embodiment

Figure 3:
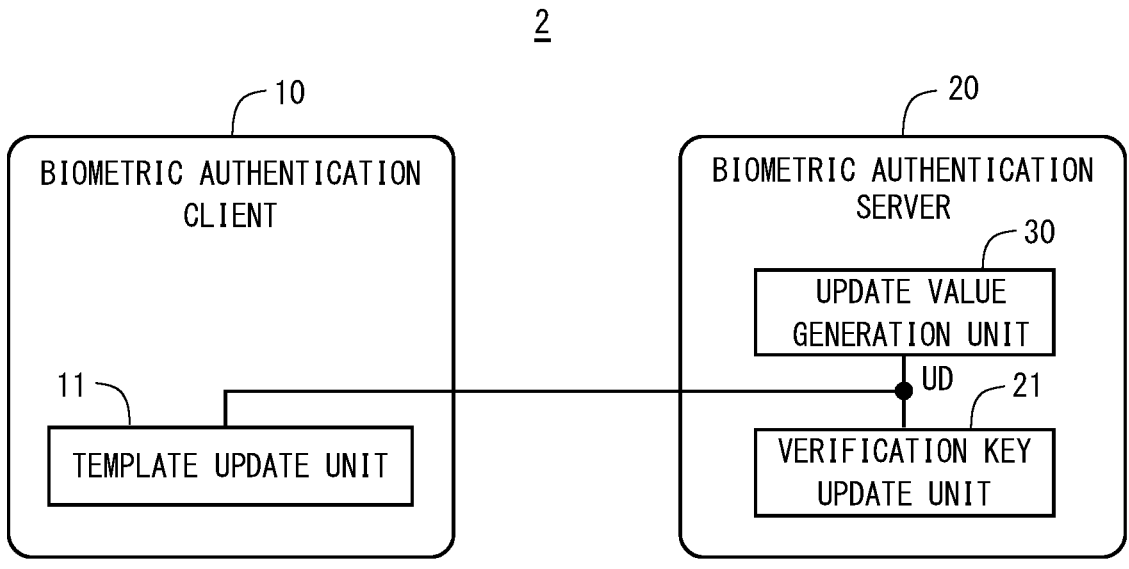
FIG. 3 is a block diagram of a biometric authentication system according to a second example embodiment.

In a second example embodiment, a biometric authentication system 2, which is another configuration of the biometric authentication system 1 according to the first example embodiment, will be described. Considering the above, a block diagram of a biometric authentication system according to the second example embodiment is shown in FIG. 3. As shown in FIG. 3, in the biometric authentication system 2 according to the second example embodiment, the update value generation unit 30 is provided on the biometric authentication server 20 side.

Figure 4:
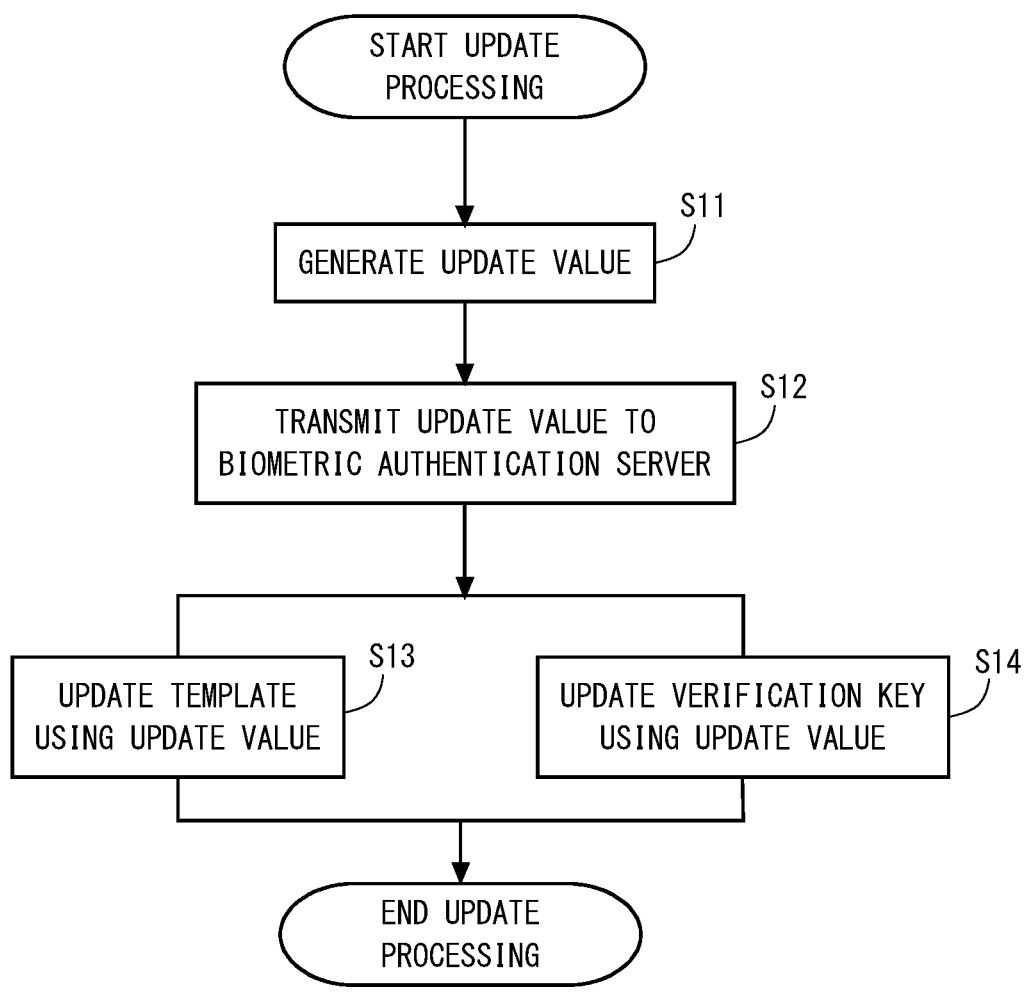
FIG. 4 is a flowchart illustrating a flow of template update processing in the biometric authentication system according to the second example embodiment.

Therefore, in the biometric authentication system 2 according to the second example embodiment, the process of passing the update value UD in the flow of update processing of the template and the verification key is different from that in the first example embodiment. Considering the above, a flowchart describing the flow of template update processing in the biometric authentication system 2 according to the second example embodiment is shown in FIG. 4. As shown in FIG. 4, in the biometric authentication system 2 according to the second example embodiment, the update value generation unit 30 first generates the update value UD (Step S11). Subsequently, the update value generation unit 30 transmits the update value UD to the biometric authentication client 10 (Step S12). Then, using the update value UD, the template update unit 11 updates the template (Step S13).

Moreover, using the update value UD, the verification key update unit 21 updates the verification key (Step S14).

Here, a method using calculation formulae different from those used in the first example embodiment will be described for a specific example of the update processing of the template and the verification key performed using the update value UD. Here, an example of performing the update processing in the biometric authentication system 2 having the biometric information, the template, and the verification key expressed by Expressions (1) to (3) of the first example embodiment with three random numbers of random number Ra", Rb" and Rc" as the update value UD is described.

In the biometric authentication system 2 according to the second example embodiment, using the update value UD generated in the update value generation unit 30, the verification key update unit 21 calculates the updated verification key expressed by Expression (16) using Expressions (13) to (15).

[Expression 13]

$$Ra'=Ra''{\cdot}Ra \tag{13}$$

[Expression 14]

$$Rb'=Rb''{\cdot}Rb \tag{14}$$

[Expression 15]

$$g^{Rc'}=g^{Rc''{\cdot}Rc} \tag{1}$$

[Expression 16]

$$\{Ra',Rb',g^{Rc'}\} \tag{16}$$

Also, in the biometric authentication system 2 according to the second example embodiment, the update value generation unit 30 passes the update value UD expressed by Expression (17) to the template update unit 11. Then, the template update unit 11 calculates the updated template expressed by Expression (20) using Expression (18) and Expression (19).

[Expression 17]

$$\left\{Ra'', \frac{1}{Rb''}, Rc''\right\} \tag{17}$$

[Expression 18]

$$\begin{aligned}temp1'[i] = (temp1[i] \cdot Rc'') \cdot Rc'' &= Ra'' \cdot Ra \cdot xi + Ra'' \cdot Rb \cdot ti + \\ &\quad Ra''(Rc + Rc'') \\ &= Ra'' \cdot Ra \cdot xi + Ra'' \cdot Rb'' \cdot \\ &\quad \left(ti \cdot \frac{1}{Rb''}\right) + Ra''(Rc + Rc'') \\ &= Ra' \cdot xi + Rb' \cdot ti' + Rc'\end{aligned} \tag{18}$$

[Expression 19]

$$temp2'[i] = g^{ti \cdot \frac{1}{R2''}} = g^{ti'} \tag{19}$$

[Expression 20]

$$\{temp1'[i], temp2'[i]\} \tag{20}$$

From the above description, the update value generation unit 30 may belong to either the biometric authentication client 10 or the biometric authentication server 20, and by having the update value generation unit 30 generate the update value UD, the template can be easily updated.

Also, the random number generated as the update value UD can be set to be any value according to the specifications of the biometric authentication system. The computational load can also be adjusted depending on what value is to be used as the update value UD.

Third Example Embodiment

A biometric authentication system according to a third example embodiment is an example of a more detailed configuration of the biometric authentication systems 1 and 2 according to the first and the second example embodiments. Considering the above, a block diagram of the biometric authentication system according to the third example embodiment is shown in FIG. 5.

Figure 5:
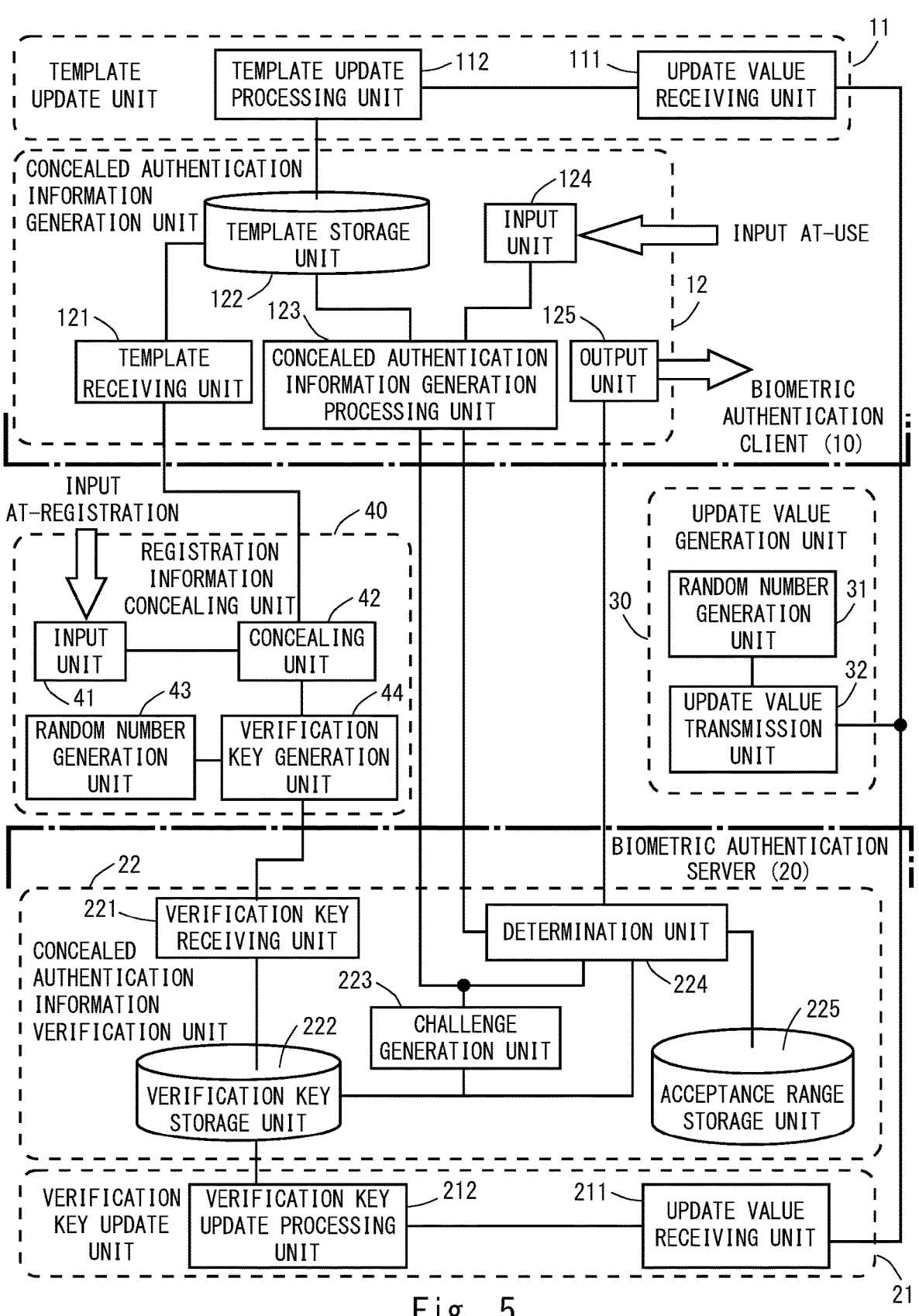
FIG. 5 is a block diagram of the biometric authentication system according to a third example embodiment.

In the example shown in FIG. 5, the biometric authentication client 10 includes the template update unit 11 and a concealed authentication information generation unit 12. In addition, the biometric authentication server 20 includes the verification key update unit 21 and a concealed authentication information verification unit 22. In FIG. 5, the update value generation unit 30 and a registration information concealing unit 40 are shown. The update value generation unit 30 and the registration information concealing unit 40 may be installed in either the biometric authentication client 10 or the biometric authentication server 20, or alternatively, they may be provided independently as separate devices from the biometric authentication client 10 or the biometric authentication server 20.

The template update unit 11 updates, using the update value UD, the template generated based on the biometric information used for authentication of an individual. The template update unit 11 includes an update value receiving unit 111 and a template update processing unit 112. The update value receiving unit 111 is an interface circuit that receives the update value UD from the update value generation unit 30 and passes it to the template update processing unit 112. The template update processing unit 112 updates the template stored therein in the concealed authentication information generation unit 12. The template update processing unit 112 updates the template using, for example, Expressions (6) and (7) or Expressions (18) and (19).

The concealed authentication information generation unit 12 conceals the biometric information acquired from the user to generate concealed authentication information used for authentication. The concealed authentication information generation unit 12 includes a template receiving unit 121, a template storage unit 122, a concealed authentication information generation processing unit 123, an input unit 124, and an output unit 125. The template receiving unit 121 receives the template generated by the registration information concealing unit 40 and stores it in the template storage unit 122. The template storage unit 122 is a storage unit that stores templates. The concealed authentication information generation processing unit 123 generates concealed authentication information by concealing the biometric information given by the input unit 124 using the template stored in the template storage unit 122 and a challenge value transmitted from the biometric authentication server 20. The input unit 124 is an input device such as a scanner or a camera that acquires the biometric information such as the user's fingerprints. The output unit 125 outputs the authentication result based on the result of the determination of the biometric information by the biometric authentication server 20 to an unillustrated function unit in the biometric authentication client 10. The biometric authentication client 10 performs, based on the authentication result, release processing of the restricted functions such as releasing the function locked state, unlocking the gate, and the like.

The biometric authentication server 20 performs, using the concealed authentication information given by the biometric authentication client 10, authentication processing to determine whether the biometric information acquired by the biometric authentication client 10 can be judged as being legitimate upon it being compared to the registered the biometric information. The biometric authentication server 20 includes the verification key update unit 21 and the concealed authentication information verification unit 22.

The verification key update unit 21 includes an update value receiving unit 211 and a verification key update processing unit 212. The update value receiving unit 211 is an interface circuit that receives the update value UD from the update value generation unit 30 and passes it to the verification key update processing unit 212. The verification key update processing unit 212 updates the verification key stored in a verification key storage unit 222 in the concealed authentication information verification unit 22. The verification key update processing unit 212 updates the verification key using, for example, Expressions (9) to (11) or Expressions (13) to (15).

The concealed authentication information verification unit 22 includes a verification key receiving unit 221, the verification key storage unit 222, a challenge generation unit 223, a determination unit 224, and an acceptance range storage unit 225. The verification key receiving unit 221 receives the verification key generated by the registration information concealing unit 40 and stores it in the verification key storage unit 222. The verification key storage unit 222 is a storage unit that stores verification keys. The challenge generation unit 223 generates a challenge value using the verification key stored in the verification key storage unit 222 and gives it to the biometric authentication client 10 and the determination unit 224. The determination unit 224 decodes the concealed authentication information given by the biometric authentication client 10 using the challenge value and the verification key and determines whether the biometric information acquired by the input unit 124 is acceptable or not by referring to the acceptance range of the acceptance range storage unit 225 in which the result of decoding is stored. Then, the determination unit 224 outputs the determination result to the output unit 125. The acceptance range storage unit 225 is a storage unit that stores information indicating the acceptance range. An acceptance range refers to information indicating the acceptable range for one variant of the biometric information.

The update value generation unit 30 generates the update value UD. In the example shown in FIG. 5, the update value generation unit 30 includes a random number generation unit 31 and an update value transmission unit 32. The random number generation unit 31 generates a random number that will be the update value UD. The update value transmission unit 32 transmits the random numbers generated by the random number generation unit 31 as the update value UD to the template update unit 11 and the verification key update unit 21.

The registration information concealing unit 40 performs registration processing of the biometric information of the user in the biometric authentication system. The registration information concealing unit 40 includes an input unit 41, a concealing unit 42, a random number generation unit 43, and a verification key generation unit 44. The input unit 41 may be the same device as the input unit 124 if, for example, the registration information concealing unit 40 is incorporated in the biometric authentication client 10. The input unit 41 is a device for acquiring the biometric information of a user. The concealing unit 42 generates a template by concealing the biometric information acquired by the input unit 41 based on prescribed rules. The template generated by the concealing unit 42 is passes through the template receiving unit 121 and then stored in the template storage unit 122. The random number generation unit 43 generates a random number. The verification key generation unit 44 generates a verification key by applying a random number generated by the random number generation unit 43 to the template generated by the concealing unit 42. The verification key generated by the verification key generation unit 44 is passed through the verification key receiving unit 221 and is then stored in the verification key storage unit 222.

In the above description, in the biometric authentication system according to the third example embodiment, the processing blocks for realizing the authentication function that the biometric authentication system has in addition to the template update processing have been explained. The processing block described in the third example embodiment is a part of the function implemented in the biometric authentication system, and the biometric authentication system may have other processing functions.

Fourth Example Embodiment

In a fourth example embodiment, a hardware configuration for realizing a biometric authentication system will be described. Considering the above, a block diagram describing an example of the hardware configuration of the biometric authentication system according to the example embodiment is shown in FIG. 6. The example shown in FIG. 6 is an example of a hardware configuration, and it is not intended to exclude other hardware configurations that realize the biometric authentication system 1.

In the example shown in FIG. 6, the biometric authentication system includes one biometric authentication server 20 and a plurality of the biometric authentication clients 10 (e.g., biometric authentication clients 10a to 10e). Also, in the example shown in FIG. 6, the biometric authentication server 20 and the biometric authentication clients 10a to 10e are communicably connected to each other through a network.

And, since the biometric authentication clients 10a to 10e can be configured to have the same hardware configuration, the hardware configuration of the biometric authentication clients 10a to 10e will be described using the biometric authentication client 10a as an example.

The biometric authentication client 10a has a first arithmetic unit (for example, an arithmetic unit 100), a memory 101, an input unit 102, and a communication interface 103. The arithmetic unit 100 executes a program that implements the biometric authentication system. Examples of such a program include a template update processing program that implements the template update unit 11 configured to update templates and a part of the biometric program that implements the functions of the concealed authentication information generation unit 12. The memory 101 is a storage unit in which the template update processing program and the biometric program are stored. The memory 101 is a storage unit that serves as the template storage unit 122. The input unit 102 is a hardware that realizes the input unit 124 and an example thereof is a scanner or a camera that acquires the biometric information such as fingerprints. The communication interface 103 is an interface circuit for the arithmetic unit 100 to communicate with the biometric authentication server 20.

The biometric authentication server 20 includes a second arithmetic unit (for example, an arithmetic unit 200), a memory 201, and a communication interface 202. The arithmetic unit 200 executes a program for implementing the biometric authentication system. Examples of such a program include a verification key update program that implements the verification key update unit 21 and a part of the biometric program that implements the functions of the concealed authentication information verification unit 22. The memory 201 is a storage unit in which the verification key update program and the biometric program are stored. The memory 201 is a storage unit that serves as the verification key storage unit 222 and the acceptance range storage unit 225, and the communication interface 202 is an interface circuit for the arithmetic unit 200 to communicate with the biometric authentication clients 10*a* to 10*e*.

Thus, the biometric authentication system can be realized by executing a program in a device having a hardware configuration equivalent to a computer. Note that the biometric authentication system can also be configured using dedicated hardware that realizes the functions described above.

The present disclosure is not limited to the above-mentioned example embodiments and can be changed as appropriate without departing from the gist of the present disclosure.

(Supplementary Note 1)

A biometric authentication system comprising:

an update value generation unit configured to generate an update value;

a first update processing unit configured to update, using the update value, a template generated based on biometric information, and a second update processing unit configured to update, using the update value, a verification key generated along with the template based on the biometric information.

(Supplementary Note 2)

The biometric authentication system described in Supplementary Note 1, further comprising:

a concealed information generation unit configured to generate initial values of the template and the verification key based on the biometric information; and a template storage unit configured to store the template, and a verification key storage unit configured to store the verification key.

(Supplementary Note 3)

The biometric authentication system described in Supplementary Note 2, wherein the first update processing unit updates the template by multiplying a value contained in the template stored in the template storage unit by the update value, and the second update processing unit updates the verification key by multiplying a value contained in the verification key stored in the verification key storage unit by the update value.

(Supplementary Note 4)

The biometric authentication system described in any one of Supplementary Notes 1 to 3, wherein the update value generation unit includes a random number generation unit and is configured to use the random number generated by the random number generation unit as the update value.

12

(Supplementary Note 5)

The biometric authentication system described in any one of Supplementary Notes 1 to 4, further comprising:

a concealed authentication information generation device configured to generate concealed authentication information by concealing, using the template, the biometric information which is newly entered and a concealed authentication information verification device configured to determine whether or not the newly entered biometric information is acceptable by applying the verification key to the concealed authentication information.

(Supplementary Note 6)

A template updating method for a biometric authentication system that comprises a template storage unit configured to store a template used for concealing biometric information and a verification key storage unit configured to store a verification key used for verification of the concealed biometric information, the method comprising:

generating an update value in the biometric authentication system;

updating the template using the update value; and updating the verification key using the update value.

(Supplementary Note 7)

The template updating method described in Supplementary Note 6, wherein the template is updated by multiplying a value contained in the template by the update value, and the verification key is updated by multiplying the value contained in the verification key by the update value.

(Supplementary Note 8)

The template updating method described in Supplementary Note 6 or 7, wherein the update value is generated using a random number generated in the biometric authentication system.

(Supplementary Note 9)

The template updating method described in any one of Supplementary Notes 6 to 8, wherein the update value is generated by either a biometric authentication client device provided with the template storage unit or a biometric authentication server device provided with the verification key.

(Supplementary Note 10)

The template updating method described in any one of Supplementary Notes 6 to 9, wherein concealed authentication information is generated by concealing, using the template, the input biometric information, which is newly entered, and a determination is made as to whether or not the newly entered biometric information is acceptable by applying the verification key to the concealed authentication information.

(Supplementary Note 11)

A computer-readable storage medium storing a template update program to be executed in a biometric authentication system comprising a template storage unit configured to store a template used for concealing biometric information, a verification key storage unit configured to store a verification key used for verifying the concealed biometric information, and an arithmetic unit configured to execute a program, wherein the template update program is for performing:

an update value generation process for generating an update value in the biometric authentication system, and a template update process for updating the template using the update value, and

13 a verification key update process for updating the verification key using the update value.

(Supplementary Note 12)

The computer-readable storage medium storing a template update program to be executed in a biometric authentication system described in Supplementary Note 11, wherein in the template update process, the template is updated by multiplying a value contained in the template by the update value, and in the verification key update process, the verification is updated by multiplying the value contained in verification key by the update value.

(Supplementary Note 13)

The computer-readable storage medium storing a template update program described in Supplementary Note 11 or 12, wherein in the template update process, the update value is generated using the random number generated in the biometric authentication system.

(Supplementary Note 14)

The computer-readable storage medium storing a template update program described in any one of Supplementary Notes 11 to 13, wherein the template updating process is performed according to a program executed by a first arithmetic unit in a biometric authentication client device provided with the template storage unit, the verification key updating process is performed by a program executed by a second arithmetic unit provided in a biometric authentication server device provided with the verification key, and the update value generation process is performed by a program executed by either the first arithmetic unit or the second arithmetic unit.

(Supplementary Note 15)

The computer-readable storage medium storing a template update program described any one of Supplementary Notes 11 to 14, the medium further storing:

a concealed authentication information generation program for generating concealed authentication information by concealing, using the template, the biometric information which is newly entered; and a determination program for determining whether the newly entered biometric information is acceptable by applying the verification key to the concealed authentication information.

(Supplementary Note 16)

A biometric authentication client device comprising:

an update value generation unit configured to generate an update value; and a template update processing unit configured to update, using the update value, a template generated based on biometric information, the update value generation unit being configured to transmit the update value to a biometric authentication server device having a verification key generated along with the template based on the biometric information.

(Supplementary Note 17)

A biometric authentication server device comprising:

an update value generation unit configured to update an update value; and a verification key update processing unit configured to update a verification key using the update value, the verification key being used for verifying the validity of concealed authentication information that is concealed using a template generated based on biometric information,

14 the update value generation unit being configured to transmit the update value to the biometric authentication client device that includes the template.

REFERENCE SIGNS LIST

1 BIOMETRIC AUTHENTICATION SYSTEM
2 BIOMETRIC AUTHENTICATION SYSTEM
BIOMETRIC AUTHENTICATION CLIENT
11 TEMPLATE UPDATE UNIT
12 CONCEALED AUTHENTICATION INFORMATION GENERATION UNIT
20 BIOMETRIC AUTHENTICATION SERVER
21 VERIFICATION KEY UPDATE UNIT
22 CONCEALED AUTHENTICATION INFORMATION VERIFICATION UNIT
30 UPDATE VALUE GENERATION UNIT
31 RANDOM NUMBER GENERATION UNIT
32 UPDATE VALUE TRANSMISSION UNIT
40 REGISTRATION INFORMATION CONCEALING UNIT
41 INPUT UNIT
42 CONCEALING UNIT
43 RANDOM NUMBER GENERATION UNIT
44 VERIFICATION KEY GENERATION UNIT
111 UPDATE VALUE RECEIVING UNIT
112 TEMPLATE UPDATE PROCESSING UNIT
121 TEMPLATE RECEIVING UNIT
122 TEMPLATE STORAGE UNIT
123 CONCEALED AUTHENTICATION INFORMATION GENERATION PROCESSING UNIT
124 INPUT UNIT
125 OUTPUT UNIT
211 UPDATE VALUE RECEIVING UNIT
212 VERIFICATION KEY UPDATE PROCESSING UNIT
221 VERIFICATION KEY RECEIVING UNIT
222 VERIFICATION KEY STORAGE UNIT
223 CHALLENGE GENERATION UNIT
224 DETERMINATION UNIT
225 ACCEPTANCE RANGE STORAGE UNIT
100 ARITHMETIC UNIT
101 MEMORY
102 INPUT UNIT
103 COMMUNICATION INTERFACE
200 ARITHMETIC UNIT
201 MEMORY
202 COMMUNICATION INTERFACE
UD UPDATE VALUE

The invention claimed is:

1. A biometric authentication system comprising:

at least one processor; and memory storing instructions, wherein the instructions, when executed by the at least one processor, cause the biometric authentication system to:

generate, based on biometric information, initial values of (i) a template used for concealing biometric information and (ii) a verification key used for verification of the concealed biometric information, store the template in a template storage and store the verification key in a verification key storage, generate an update value;

update the template stored in the template storage by multiplying a value contained in the template by the update value, and

update the verification key stored in the verification key storage by multiplying a value contained in the verification key by the update value.

2. The biometric authentication system according to claim 1, wherein the instructions, when executed by the at least one processor, cause the biometric authentication system to generate a random number and use the random number as the update value.

3. The biometric authentication system according to claim 1 wherein the instructions, when executed by the at least one processor, cause the biometric authentication system to:

generate concealed authentication information by concealing, using the template, the biometric information which is newly entered, and determine whether the newly entered biometric information is acceptable by applying the verification key to the concealed authentication information.

4. A template updating method for a biometric authentication system that comprises a template storage configured to store a template used for concealing biometric information and a verification key storage configured to store a verification key used for verification of the concealed biometric information, the method comprising:

generating, based on the biometric information, initial values of (i) the template and (ii) the verification key, storing the template in the template storage and storing the verification key in the verification key storage, generating an update value in the biometric authentication system;

updating the template stored in the template storage by multiplying a value contained in the template by the update value; and updating the verification key stored in the verification key storage by multiplying a value contained in the verification key by the update value.

5. The template updating method according to claim 4, wherein the update value is generated using a random number generated in the biometric authentication system.

6. The template updating method according to claim 4, wherein the update value is generated by either a biometric authentication client device comprising the template storage or a biometric authentication server device comprising the verification key storage.

7. The template updating method according to claim 4, wherein concealed authentication information is generated by concealing, using the template, the input biometric information, which is newly entered, and a determination is made as to whether or not the newly entered biometric information is acceptable by applying the verification key to the concealed authentication information.

8. A non-transitory computer-readable storage medium storing at least one program to be executed in a biometric authentication system comprising a template storage configured to store a template used for concealing biometric information, a verification key storage configured to store a verification key used for verifying the concealed biometric information, and at least one processor, wherein the at least one program, when executed by the at least one processor, causes the biometric authentication system to:

generate, based on biometric information, initial values of (i) the template and (ii) the verification key, store the template in the template storage and store the verification key in the verification key storage, generate an update value in the biometric authentication system,

update the template stored in the template storage by multiplying a value contained in the template by the update value, and update the verification key stored in the verification key storage by multiplying a value contained in the verification key by the update value.

9. The non-transitory computer-readable storage medium storing the at least one program according to claim 8, wherein in the template update process, the update value is generated using the random number generated in the biometric authentication system.

10. The non-transitory computer-readable storage medium storing the at least one program according to claim 8, wherein the template updating process is performed according to a program executed by a first arithmetic unit in a biometric authentication client device comprising the template storage, the verification key updating process is performed by a program executed by a second arithmetic unit provided in a biometric authentication server device comprising the verification key storage, and the update value generation process is performed by a program executed by either the first arithmetic unit or the second arithmetic unit.

11. The non-transitory computer-readable storage medium storing the at least one program according to claim 8, wherein the at least one program further comprises:

a concealed authentication information generation program for generating concealed authentication information by concealing, using the template, the biometric information which is newly entered; and a determination program for determining whether the newly entered biometric information is acceptable by applying the verification key to the concealed authentication information.

12. A biometric authentication client device comprising:

at least one processor; and memory storing instructions, wherein the instructions, when executed by the at least one processor, cause the biometric authentication client device to:

acquire input biometric information;

transmit the biometric information to a biometric authentication server device to cause the biometric authentication server device to:

generate, based on biometric information, initial values of (i) a template used for concealing biometric information and (ii) a verification key used for verification of the concealed biometric information;

store the verification key in a verification key storage;

transmit the template to the biometric authentication client device;

store the template in a template storage;

generate an update value;

update the template stored in the template storage by multiplying a value contained in the template by the update value; and transmit the update value to a biometric authentication server device to cause the biometric authentication server device to update the verification key in the verification key storage by multiplying a value contained in the verification key by the update value.

13. A biometric authentication server device comprising:

at least one processor; and memory storing instructions, wherein the instructions, when executed by the at least one processor, cause the biometric authentication server device to:

generate, based on biometric information, initial values of (i) a template used for concealing biometric information and (ii) a verification key used for verification of the concealed biometric information;

store the verification key in a verification key storage;

transmit the template to the biometric authentication client device to cause the biometric authentication client device to:

store the template in a template storage;

generate an update value;

update the template stored in the template storage by multiplying a value contained in the template by the update value; and transmit the update value to the biometric authentication server device;

update the verification key stored in the verification key storage by multiplying a value contained in the verification key by the update value; and transmit the update value to the biometric authentication client device storing the template.

\* \* \* \* \*